US012683182B2

(12) United States Patent
Wu et al.

(10) Patent No.: US 12,683,182 B2
(45) Date of Patent: Jul. 14, 2026

(54) HEATING DEVICE, AND BATTERY MANUFACTURING APPARATUS AND METHOD

(71) Applicant: CONTEMPORARY AMPEREX TECHNOLOGY (HONG KONG) LIMITED, Hong Kong (CN)

(72) Inventors: Zhiyang Wu, Ningde (CN); Yunzhi Li, Ningde (CN); Zhihui Wang, Ningde (CN); Dajun Ni, Ningde (CN); Jiayi Zhao, Ningde (CN); Zhihua Wen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 451 days.

(21) Appl. No.: 18/208,899

(22) Filed: Jun. 13, 2023

(65) Prior Publication Data

US 2023/0327173 A1     Oct. 12, 2023

Related U.S. Application Data

(63) Continuation of application No. PCT/CN2022/098984, filed on Jun. 15, 2022.

(30) Foreign Application Priority Data

Aug. 31, 2021    (CN) .......................... 202111017127.0

(51) Int. Cl.
| | |
|---|---|
| *H01M 10/04* | (2006.01) |
| *B65H 23/02* | (2006.01) |
| *H01M 50/403* | (2021.01) |

(52) U.S. Cl.
CPC .... H01M 10/0404 (2013.01); B65H 23/0216 (2013.01); H01M 50/403 (2021.01); B65H 2301/5143 (2013.01); B65H 2553/42 (2013.01)

(58) Field of Classification Search
CPC ............ H01M 10/0404; H01M 50/403; B65H 23/0216; B65H 2301/5143; B65H 2553/42; B29C 65/02
See application file for complete search history.

(56) References Cited

U.S. PATENT DOCUMENTS

| | | | |
|---|---|---|---|
| 9,466,825 B2 | 10/2016 | Miyazaki et al. | |
| 2014/0059875 A1* | 3/2014 | Yuhara | .............. B29C 66/81429 33/613 |

(Continued)

FOREIGN PATENT DOCUMENTS

| | | |
|---|---|---|
| CN | 207183440 U | 4/2018 |
| CN | 108199005 A | 6/2018 |

(Continued)

OTHER PUBLICATIONS

English translation of CN-210073922-U, dated Dec. 22, 2025 (Year: 2025).*
English translation of WO-2019209066-A1, dated Dec. 22, 2025 (Year: 2025).*
English translation of KR-20200113297-A, dated Dec. 22, 2025 (Year: 2025).*

(Continued)

*Primary Examiner* — Michael G Hoang
*Assistant Examiner* — Brett P. Mallon
(74) *Attorney, Agent, or Firm* — XSENSUS LLP

(57) ABSTRACT

The present application relates to a heating device, and a battery manufacturing apparatus and method, and relates to the technical field of battery manufacturing. The heating device is configured to heat a material strip upstream of a first station, and may include: a support; a first heater movably mounted to the support; and a first driver mounted to the support and configured to drive the first heater to move in a feeding direction of the material strip, such that the first heater is movable between a first position close to the first station and a second position away from the first station.

20 Claims, 6 Drawing Sheets

(56)                    References Cited

U.S. PATENT DOCUMENTS

| | | | | |
|---|---|---|---|---|
| 2015/0129107 A1* | 5/2015 | Miyazaki | ........... | B32B 38/1841 |
| | | | | 156/522 |
| 2016/0276712 A1* | 9/2016 | Sale | .................. | H01M 10/0585 |

FOREIGN PATENT DOCUMENTS

| | | | | | |
|---|---|---|---|---|---|
| CN | 110121810 A | | 8/2019 | | |
| CN | 209910358 U | | 1/2020 | | |
| CN | 210073922 U | * | 2/2020 | | |
| CN | 110993862 A | | 4/2020 | | |
| CN | 211045636 U | | 7/2020 | | |
| CN | 211879535 U | | 11/2020 | | |
| CN | 112820929 A | * | 5/2021 | ......... | B32B 38/1833 |
| JP | 2000-208137 A | | 7/2000 | | |
| KR | 20200113297 A | * | 10/2020 | ........ | H01M 10/0459 |
| WO | WO-2019209066 A1 | * | 10/2019 | ............. | B29C 65/02 |

OTHER PUBLICATIONS

English translation of CN-112820929-A, dated Dec. 22, 2025 (Year: 2025).*

Partial Supplementary European Search Report issued Sep. 19, 2024 in European Patent Application No. 22862800.4.

Extended European Search Report issued Jan. 10, 2025 in European Patent Application No. 22862800.4.

First Office Action issued Sep. 20, 2023 in Chinese Patent Application No. 202111017127.0 with English translation thereof.

Second Office Action issued Jan. 21, 2024 in Chinese Patent Application No. 202111017127.0 with English translation thereof.

Notification to Grant Patent Right for Invention issued Mar. 25, 2024 in Chinese Patent Application No. 202111017127.0 with English translation thereof.

International Search Report and Written Opinion mailed on Sep. 14, 2022, received for PCT Application PCT/CN2022/098984, filed on Jun. 15, 2022, 12 pages including English Translation.

\* cited by examiner

HEATING DEVICE, AND BATTERY MANUFACTURING APPARATUS AND METHOD

CROSS-REFERENCE TO RELATED APPLICATIONS

The present application is a continuation of International Application No. PCT/CN2022/098984, filed on Jun. 15, 2022, which claims the priority of Chinese Patent Application No. 202111017127.0, filed on Aug. 31, 2021 and entitled "HEATING DEVICE, AND BATTERY MANU-FACTURING APPARATUS AND METHOD", each of which is incorporated herein by reference in its entirety.

TECHNICAL FIELD

The present application relates to the technical field of battery manufacturing, and particularly relates to a heating device, and a battery manufacturing apparatus and method.

BACKGROUND ART

During battery production, it is necessary to perform thermal processing on a material strip. Usually, a heating device is used to heat the material strip at a station before a thermal processing station.

During production, material waste is likely to occur, which results in high manufacturing cost.

SUMMARY OF THE DISCLOSURE

An objective of the present application is to provide a heating device, and a battery manufacturing apparatus and method. The heating device reduces material waste, and saves manufacturing cost.

The present application is achieved by the following technical solutions.

In a first aspect, an embodiment of the present application provides a heating device for heating a material strip upstream of a first station, the heating device including: a support; a first heating module or heater movably mounted to the support; and a first driving module or driver mounted to the support and configured to drive the first heating module to move in a feeding direction of the material strip, such that the first heating module is movable between a first position close to the first station and a second position away from the first station.

The heating device according to the embodiment of the present application is arranged upstream of the first station, and after shutdown and before operation, the first driving module drives the first heating module from the second position to the first position, such that the first heating module heats the material strip at the first position to ensure that a temperature of the material strip entering the first station satisfies process requirements of the first station, the problem of occurrence of waste products due to that a temperature of the part of the material strip between the heating device and the first station does not satisfy the process requirements is solved, and material waste and manufacturing cost are reduced.

In a second aspect, an embodiment of the present application further provides a battery manufacturing apparatus, including: a conveying device for conveying a separator; the heating device according to any one of the above solutions, wherein the heating device is configured to heat the separator; and a hot pressing device located at the first station and configured to bonding a plate to the separator by hot pressing.

In a third aspect, an embodiment of the present application further provides a battery manufacturing method, including: after shutdown and before operation, moving a first heating module to a first position to preheat the part of a separator between a heating device and a hot pressing device; and after the preheating is completed, moving the first heating module to a second position to heat the separator, and operating a conveying device.

Some of the additional aspects and advantages of the present application will be set forth in the following description, and some will become apparent from the following description, or be learned by practice of the present application.

BRIEF DESCRIPTION OF THE DRAWINGS

In order to more clearly describe the technical solutions of embodiments of the present application, the accompanying drawings required in the embodiments will be described briefly below. It should be understood that the following accompanying drawings illustrate only some embodiments of the present application and therefore should not be construed as a limitation on the scope thereof. For those of ordinary skill in the art, other relevant accompanying drawings can also be obtained from these accompanying drawings without any creative effort.

Figure 1:
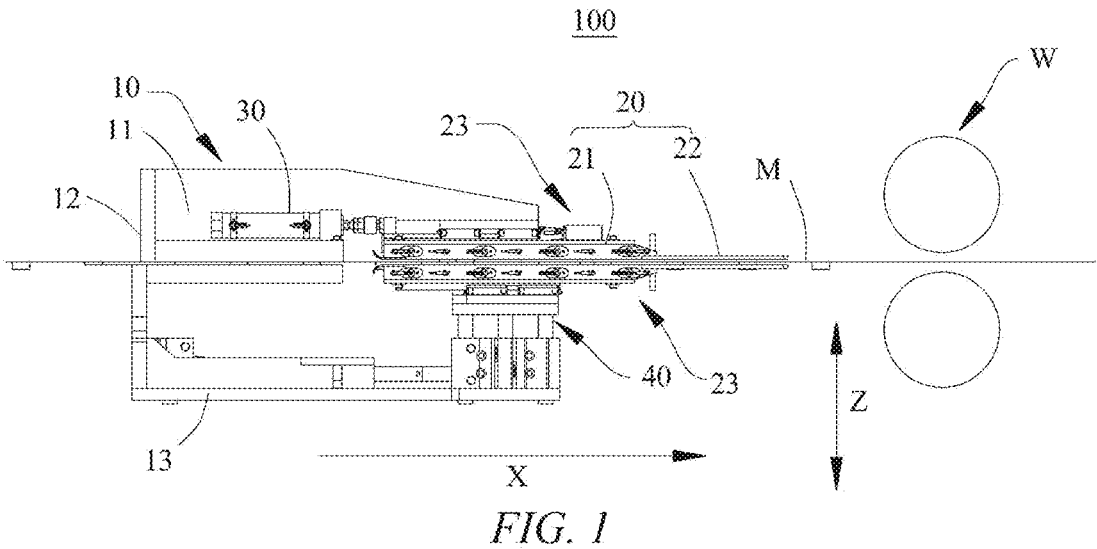
FIG. 1 is a schematic diagram of a first heating module of a heating device according to some embodiments of the present application at a second position.

In the accompanying drawings, the figures are not drawn to scale.

List of reference signs: 100—heating device; 10—support; 11—first sub—support; 12—second sub—support;

13—third sub—support; 20—first heating module; 21—first heating unit; 210—stepped slot; 211—base plate; 212—heating member; 22—second heating unit; 221—heating plate; 23—first heating assembly; 231—first opening; 232—second opening; 24—first gap; 25—first sliding block and rail; 26—first limiting block; 27—second limiting block; 28—slot; 29—threaded fastener; 30—first driving module; 40—second driving module; 41—second sliding block and rail; 50—second heating module; 51—second heating assembly; 52—second gap; 60—third driving module; 70—light source; 80—detection unit; 81—camera; 82—reflector; 90—position adjustment module; 91—adjustment handle; 92—lead screw; 93—nut; 94—hoop locking assembly; 1000—battery manufacturing apparatus; 300—hot pressing device; 310—hot pressing roller; M—separator; P—plate; W—first station.

DETAILED DESCRIPTION OF EMBODIMENTS

Embodiments of the technical solutions of the present application will be described in more detail below with reference to the drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the technical features modified thereby. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: three instances of A alone, A and B simultaneously, and B alone. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on the orientation or position relationship shown in the drawings and are merely intended to facilitate and simplify the description of the embodiments of the present application, rather than indicating or implying that the device or element considered must have a particular orientation or be constructed and operated in a particular orientation, and therefore not to be construed as limiting the embodiments of the present application.

In the description of the embodiments of the present application, unless otherwise explicitly specified and defined, the technical terms "mounting", "mutual connection", "connection", "fixing", etc. should be understood in a broad sense, for example, they may be a fixed connection, a detachable connection, or an integrated connection; may be a mechanical connection or an electrical connection; and may be a direct connection or an indirect connection through an intermediate medium, and may be communication between interiors of two elements or interaction between the two elements. For those of ordinary skill in the art, the specific meaning of the above terms in the embodiments of the present application can be understood according to specific situations.

During battery production, a preheating station is provided before a bonding station, and a heating device provided at the preheating station preheats a material strip, such that the material strip entering the bonding station satisfies process requirements of the bonding station. During production, material waste is likely to occur, which results in high manufacturing cost. The inventor found that after the heating device is shut down, a temperature of the material strip between the heating device and a first station (such as the bonding station) downstream thereof decreases, and a process temperature of the first station cannot be satisfied; and after the heating device is shut down and before the heating device is operated, the part of the material strip between the heating device and the first station cannot be heated, which impairs processing quality of a next procedure and results in material waste and high manufacturing cost.

In view of this, in order to solve the problems of material waste and high manufacturing cost, the inventors design a heating device after intensive study to heat a material strip upstream of the first station. The heating device includes a support, a first heating module, and a first driving module. The first heating module is movably mounted to the support. The first driving module is mounted to the support, and the first driving module is configured to drive the first heating module to move in a feeding direction of the material strip, such that the first heating module is movable between a first position close to the first station and a second position away from the first station.

In such a heating device, after shutdown and before operation, the first driving module drives the first heating module from the second position to the first position, such that the first heating module heats the material strip at the first position to ensure that a temperature of the material strip entering the first station satisfies process requirements of the first station, the problem of occurrence of waste products due to that a temperature of the part of the material strip between the heating device and the first station does not satisfy the process requirements is solved, and material waste and manufacturing cost are reduced.

It should be noted that the material strip mentioned in the embodiments of the present application may be, but is not limited to, a material strip of a separator, or other material strips that need to be heated. The first station mentioned in the present application may be, but is not limited to, a bonding station for bonding a plate to the separator by hot pressing. The first station may also be another thermal processing station having an incoming material temperature requirement. For ease of description, the embodiments are introduced with the material strip as the separator for example.

Figure 2:
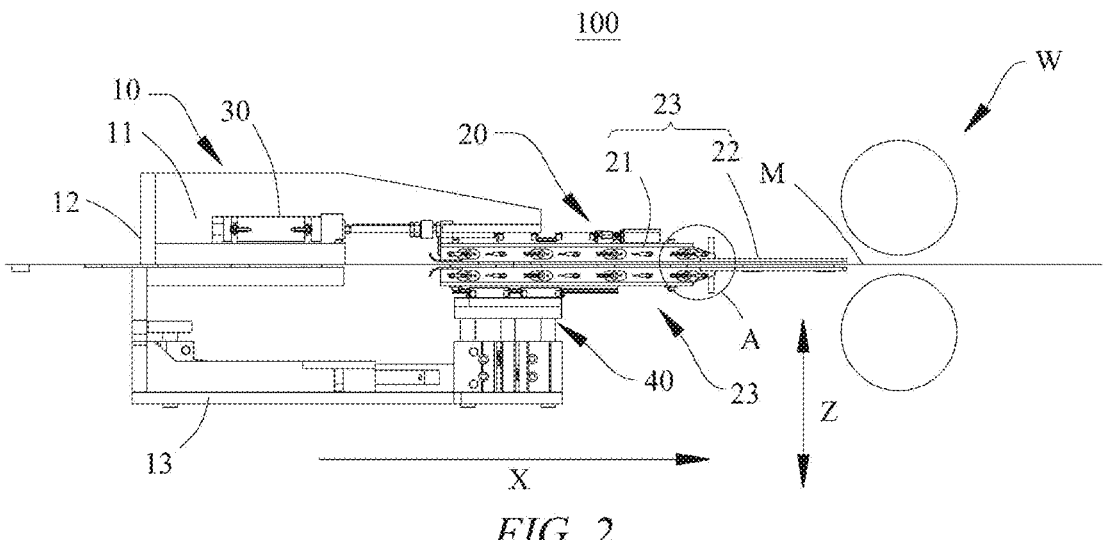
FIG. 2 is a schematic diagram of the first heating module of the heating device according to some embodiments of the present application at a first position.

With reference to FIG. 1, FIG. 1 is a schematic diagram of a first heating module 20 of a heating device 100 according to some embodiments of the present application at a second position, and FIG. 2 is a schematic diagram of the first heating module 20 of the heating device 100 according to some embodiments of the present application at a first position.

According to some embodiments of the present application, the present application provides a heating device 100 for heating a separator M upstream of a first station W. As shown in FIGS. 1-2, the heating device 100 includes a support 10, a first heating module 20, and a first driving module 30. The first heating module 20 is movably mounted to the support 10. The first driving module 30 is mounted to the support 10, and the first driving module 30 is configured to drive the first heating module 20 to move in a feeding direction X of the separator M, such that the first heating module 20 is movable between a first position close to the first station W and a second position away from the first station W.

A direction indicated by X in the figure is a feeding direction of the separator M, which is called the feeding direction X for short. "the heating device 100 provided upstream of the first station W" means a sequential relationship between the heating device 100 and the first station W during processing of the separator M, that is, the separator M is heated by the heating device 100 and then conveyed to the first station W for processing.

The support 10 provides positioning support to facilitate mounting and positioning of the first heating module 20 and the first driving module 30. The first heating module 20 is movable relative to the support 10 in the feeding direction X of the separator M. The first heating module 20 has the first position and the second position in the feeding direction X, with the first position close to the first station W and the second position away from the first station W. The first driving module 30 is mounted to the support 10, and the first driving module 30 is configured to drive the first heating module 20 to move in the feeding direction X of the separator M, such that the first heating module 20 is movable between the first position and the second position, thus changing the position of the first heating module 20.

According to the embodiment of the present application, the heating device 100 is provided upstream of the first station W, when the heating device 100 operates normally, as shown in FIG. 1, the first heating module 20 is located at the second position, and after shutdown and before operation, the first driving module 30 drives the first heating module 20 from the second position to the first position, as shown in FIG. 2, such that the first heating module 20 heats the separator M at the first position to ensure that a temperature of the separator M entering the first station W satisfies process requirements of the first station W, the problem of occurrence of waste products due to that a temperature of the part of the separator M between the heating device 100 and the first station W does not satisfy the process requirements is solved, and material waste and manufacturing cost are reduced.

According to some embodiments of the present application, optionally, the separator M is conveyed in a horizontal direction, and a thickness direction Z of the separator M is parallel to a vertical direction, so as to facilitate conveying and heating of the separator M. It should be noted that "the separator M conveyed in the horizontal direction" means that a feeding trend of the separator M is horizontal, but the separator M is not always conveyed in the horizontal direction. A direction indicated by Z in the figure is the thickness direction of the separator M.

According to some embodiments of the present application, optionally, an output end of the first driving module 30 is configured to reciprocate in the feeding direction X of the separator M. The first driving module 30 may be a driving structure such as an air cylinder, a hydraulic cylinder, or an electric push rod, or a driving structure in which an electric motor cooperate with a transmission assembly, wherein the transmission assembly may be a rack and pinion transmission assembly, a screw and nut transmission assembly, a belt transmission assembly, a chain transmission assembly, etc.

In some embodiments, the first driving module 30 may be an air cylinder, which is simple in structure and easy to assemble.

In an embodiment in which the separator M is conveyed in the horizontal direction, the first driving module 30 may be located above the separator M or below the separator M.

According to some embodiments of the present application, optionally, as shown in FIGS. 1-2, the first heating module 20 includes a first heating unit 21 and a second heating unit 22 connected to each other, wherein the first heating unit 21 and the second heating unit 22 are sequentially arranged in the feeding direction X, the second heating unit 22 is closer to the first station W than the first heating unit 21, and a surface of the second heating unit 22 away from the separator M is closer to the separator M than a surface of the first heating unit 21 away from the separator M.

The first heating unit 21 and the second heating unit 22 are sequentially arranged in the feeding direction X, so as to form two heating areas. The second heating unit 22 is closer to the first station W than the first heating unit 21. When the first heating module 20 is located at the first position, the second heating unit 22 may heat the separator M at a position closer to the first station W, so as to ensure that the process requirements of the first station W may be satisfied when the separator M enters the first station W. A surface of the second heating unit 22 close to the separator M and a surface of the first heating unit 21 close to the separator M may be coplanar, so as to ensure that the first heating unit 21 and the second heating unit 22 have the same distance from the separator M. The surface of the second heating unit 22 away from the separator M is closer to the separator M than the surface of the first heating unit 21 away from the separator M. In the thickness direction Z of the separator M, the second heating unit 22 has a smaller occupied volume than the first heating unit 21. By contrast with the same space occupied by the second heating unit 22 and the first heating unit 21, in this solution, the second heating unit 22 may extend into narrower space environment, such as an entry to the first station W, and the first position may be closer to the first station W, such that the first heating module 20 can heat the separator M at a position closer to the first station W.

Figure 3:
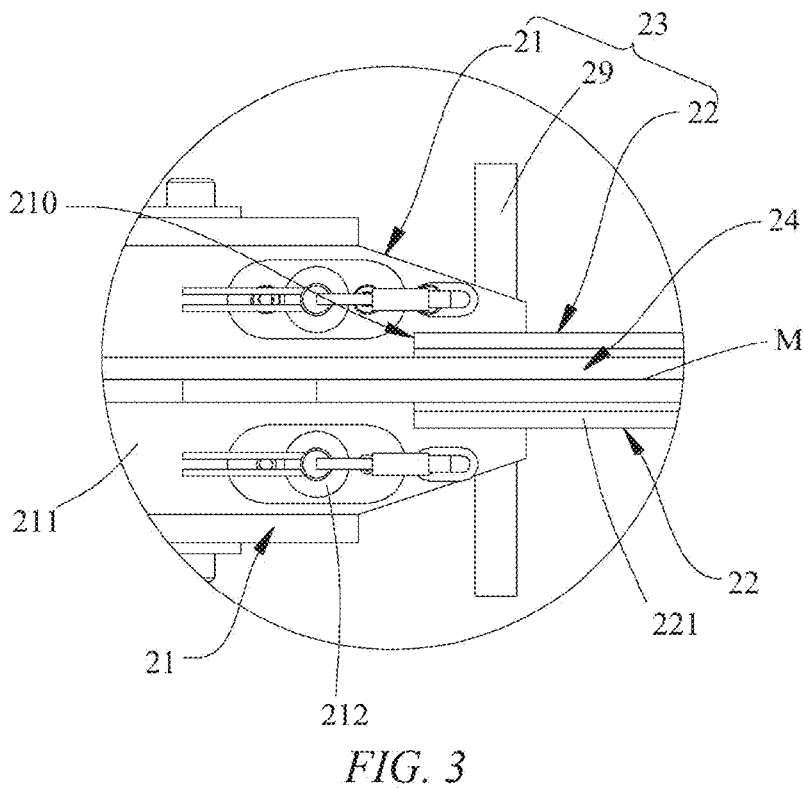
FIG. 3 is an enlarged view of part A of FIG. 2.

With reference to FIG. 3, FIG. 3 is an enlarged view of part A of FIG. 2. In some embodiments, the first heating unit 21 and the second heating unit 22 are detachably connected to each other. For example, as shown in FIG. 3, the first heating unit 21 and the second heating unit 22 are connected by means of a threaded fastener 29, and alternatively, the first heating unit 21 is engaged with the second heating unit 22.

In order to ensure the connection strength between the first heating unit 21 and the second heating unit 22, as shown in FIG. 3, a surface of the first heating unit 21 facing the separator M may be provided with a stepped slot 210, the stepped slot 210 is located at an end of the first heating unit 21 close to one end of the second heating unit 22, the second heating unit 22 may extend into the stepped slot 210, and the first heating unit 21 overlaps with the second heating unit 22, so as to ensure that the first heating unit 21 and the second heating unit 22 are connected stably.

According to some embodiments of the present application, optionally, the first heating unit 21 has higher heating power than the second heating unit 22.

Because the second heating unit 22 has a small occupied volume, and the second heating unit 22 has limited structural space, the second heating unit 22 cannot have high heating power. After shutdown and before operation, the first heating module 20 moves to the first position, the second heating unit 22 performs preheating, and then the first heating unit 21 is activated after the process temperature is reached. Due to the high heating power of the first heating unit 21, the temperature of the separator M corresponding to the first heating unit 21 increases rapidly. After a start-up temperature is reached, the first heating module 20 moves back to the second position, and conveying of the separator M is started. The first heating unit 21 is activated after the second heating unit 22 because the first heating unit 21 has shorter heating time than the second heating unit 22. Waiting time for heating when the heating device 100 operates normally is reduced, thus avoiding damages to the part of the separator M corresponding to the first heating unit 21 due to an excess temperature in the case of the first heating unit 21 and the second heating unit 22 being activated synchronously.

According to some embodiments of the present application, optionally, as shown in FIG. 3, the first heating unit 21 includes a base plate 211 and a heating member 212 embedded in the base plate 211. The heating member 212 may be a heating rod or other structures. The second heating unit 22 includes a heating plate 221, and the heating plate 221 may have a heating mode in which a silica gel heating plate 221 is attached to a surface of a metal sheet, such that the second heating unit 22 may extend into narrower space environment.

According to some embodiments of the present application, optionally, as shown in FIGS. 2-3, the first heating module 20 includes two first heating assemblies 23 arranged oppositely in the thickness direction Z of the separator M, with a first gap 24 for the separator M to pass through being formed between the two first heating assemblies 23.

The two first heating assemblies 23 are arranged oppositely in the thickness direction Z of the separator M, and the first gap 24 for the separator M to pass through is formed between the two first heating assemblies 23, such that feeding of the separator M in the first gap 24 is facilitated, and two sides of the separator M in the thickness direction Z are heated. When the separator M is located in the first gap 24, the two first heating assemblies 23 may heat the separator M on opposite sides of the separator M in the thickness direction Z, such that the separator M is evenly heated to ensure a better heating effect.

In an embodiment in which the separator M is conveyed in the horizontal direction, the two first heating assemblies 23 are located above and below the separator M respectively, such that the two first heating assemblies 23 heat the separator M from above and below the separator M.

In an embodiment in which the first heating module 20 includes first heating units 21 and second heating units 22, the number of the first heating units 21 and the number of the second heating units 22 are both two, the two first heating units 21 are located on two sides of the separator M in the thickness direction Z, respectively, the two second heating units 22 are located on two sides of the separator M in the thickness direction Z, respectively, and the first heating unit 21 and the second heating unit 22 located on the same side of the separator M form one first heating assembly 23.

According to some embodiments of the present application, optionally, as shown in FIG. 2, the heating device 100 further includes a second driving module 40 for driving the two first heating assemblies 23 to move close to or away from each other in the thickness direction Z of the separator M to change a size of the first gap 24.

The size of the first gap 24 indicates a distance between the two first heating assemblies 23 in the thickness direction Z of the separator M. The two first heating assemblies 23 may move close to or away from each other in the thickness direction Z of the separator M, such that the size of the first gap 24 is reduced or increased, that is, distances between the first heating assemblies 23 and the separator M are changed.

The second driving module 40 is configured to provide a driving force, and the second driving module 40 drives the two first heating assemblies 23 to move close to or away from each other in the thickness direction Z of the separator M, such that the size of the first gap 24 may be adjusted depending on different separators M, providing high adaptability to meet heating requirements. In addition, the first gap 24 is enlarged, such that penetration of the separator M is facilitated, and the production efficiency is improved.

According to some embodiments of the present application, optionally, an output end of the second driving module 40 is configured to reciprocate in the thickness direction Z of the separator M. The second driving module 40 may be a driving structure such as an air cylinder, a hydraulic cylinder, or an electric push rod, or a driving structure in which an electric motor cooperate with a transmission assembly, wherein the transmission assembly may be a rack and pinion transmission assembly, a screw and nut transmission assembly, a belt transmission assembly, a chain transmission assembly, etc. In some embodiments, the second driving module 40 may be a hydraulic cylinder, which is simple in structure and easy to assemble.

Figure 4:
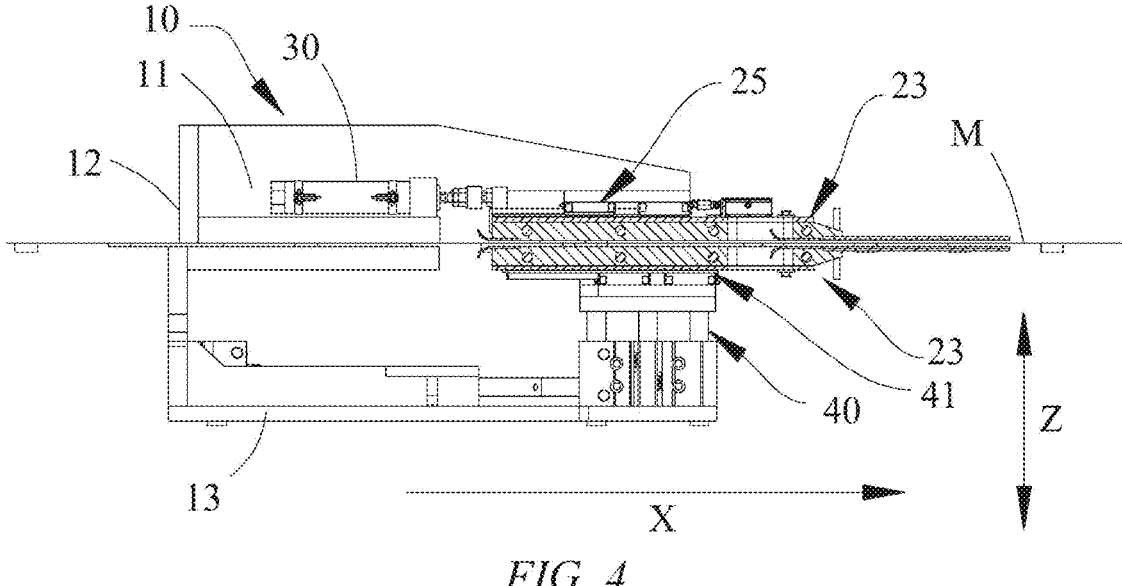
FIG. 4 is a cross-sectional view of a first heating module according to some embodiments of the present application.

With reference to FIG. 4, FIG. 4 is a cross-sectional view of a first heating module 20 according to some embodiments of the present application. According to some embodiments of the present application, optionally, as shown in FIGS. 2 and 4, one of the two first heating assemblies 23 is connected to an output end of a first driving module 30, the other one of the two first heating assemblies is connected to an output end of a second driving module 40, and the two first heating assemblies 23 are slidably connected to each other in a thickness direction Z of the separator M.

The two first heating assemblies 23 are connected to the first driving module 30 and the second driving module 40, respectively, that is, the first driving module 30 acts on one of the two first heating assemblies 23, and the second driving module 40 acts on the other one of the two first heating assemblies 23. The first driving module 30 and the second driving module 40 may be arranged on two sides of the separator M in the thickness direction Z, so as to facilitate use for corresponding heating assemblies. The two first heating assemblies 23 are slidably connected to each other in the thickness direction Z of the separator M, the two first heating assemblies 23 may slide relative each other in the thickness direction Z of the separator M, and the two first heating assemblies 23 may synchronously move in the feeding direction X of the separator M under the action of the first driving module 30.

The two first heating assemblies 23 are connected to the first driving module 30 and the second driving module 40, respectively, so as to reduce space occupation. The first driving module 30 and the second driving module 40 may be located on two sides of the separator M in the thickness direction Z, and the positions of the first driving module 30 and the second driving module 40 are rationally arranged to provide a rational configuration and a simple structure.

In an embodiment in which the separator M is conveyed in a horizontal direction, the first driving module 30 may be arranged above the separator M, and the second driving module 40 may be arranged below the separator M.

According to some embodiments of the present application, optionally, the other one of the two first heating assemblies 23 is slidably connected to the output end of the second driving module 40 in the feeding direction X.

The two first heating assemblies 23 are connected to the first driving module 30 and the second driving module 40, respectively, wherein the first heating assembly 23 connected to the second driving module 40 is slidably connected to the output end of the second driving module 40 in the feeding direction X, and the first heating assembly 23 can move relative to the output end of the second driving module 40 in the feeding direction X. That is, when the two first heating assemblies 23 move in the feeding direction X of the separator M under the action of the first driving module 30, the first heating assembly 23 connected to the second driving module 40 can move relative to the second driving module 40.

The other one of the two first heating assemblies 23 is slidably connected to the output end of the second driving module 40, such that the two first heating assemblies 23 are driven by the first driving module 30 to move stably in the feeding direction X relative to a support 10 to prevent a movement of the second driving module 40 along with the first heating assemblies 23, which results in interference between components, unstable movement and thus potential safety hazards.

Figure 8:
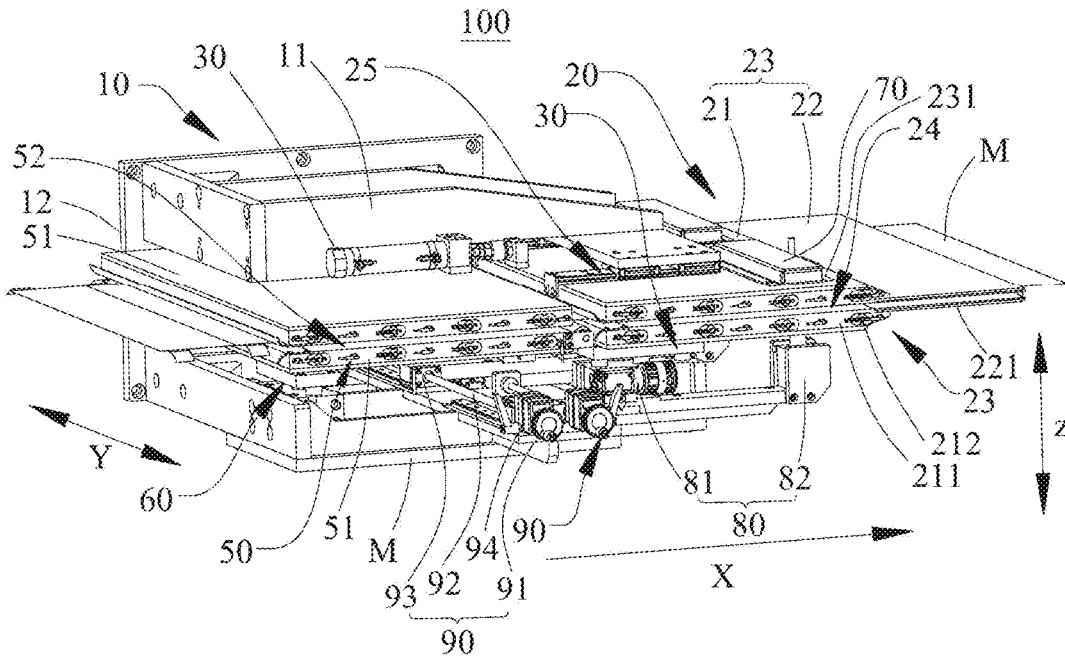
FIG. 8 is a schematic structural diagram of a heating device according to some embodiments of the present application.

According to some embodiments of the present application, optionally, as shown in FIGS. 1, 2 and 4, the support 10 includes a first sub-support 11, a second sub-support 12, and a third sub-support 13. The second sub-support 12 is arranged in the thickness direction Z of the separator M and is located on one side of the separator M in a width direction Y (see FIG. 8). The first sub-support 11 and the third sub-support 13 are connected to two ends of the second sub-support 12 in the thickness direction Z of the separator M, respectively. The first sub-support 11 and the third sub-support 13 each are arranged in parallel with the separator M. The separator M is located between the first sub-support 11 and the third sub-support 13. A direction indicated by Y in FIG. 8 is the width direction of the separator M.

In some embodiments, the first driving module 30 may be arranged on the first sub-support 11, and the second driving module 40 may be arranged on the third sub-support 13.

In order to ensure stable movement of the first heating module 20, one of the two first heating assemblies 23 is slidably connected to the first sub-support 11, and the other one of the two first heating assemblies is slidably connected to the output of the second driving module 40. For example, as shown in FIG. 4, the first sub-support 11 may be slidably connected to a corresponding first heating assembly 23 by means of a first sliding block and rail 25, and the output end of the second driving module 40 may be slidably connected to a corresponding first heating assembly 23 by means of a second sliding block and rail 41.

According to some embodiments of the present application, optionally, one of the two first heating assemblies 23 may be provided with a protrusion, and the other one of the two first heating assemblies may be provided with an open recess for inserting the protrusion in the thickness direction Z of the separator M, such that the two first heating assemblies 23 may slide relative to each other in the thickness direction Z of the separator M, and the two first heating assemblies 23 may move synchronously in the feeding direction X.

Figure 5:
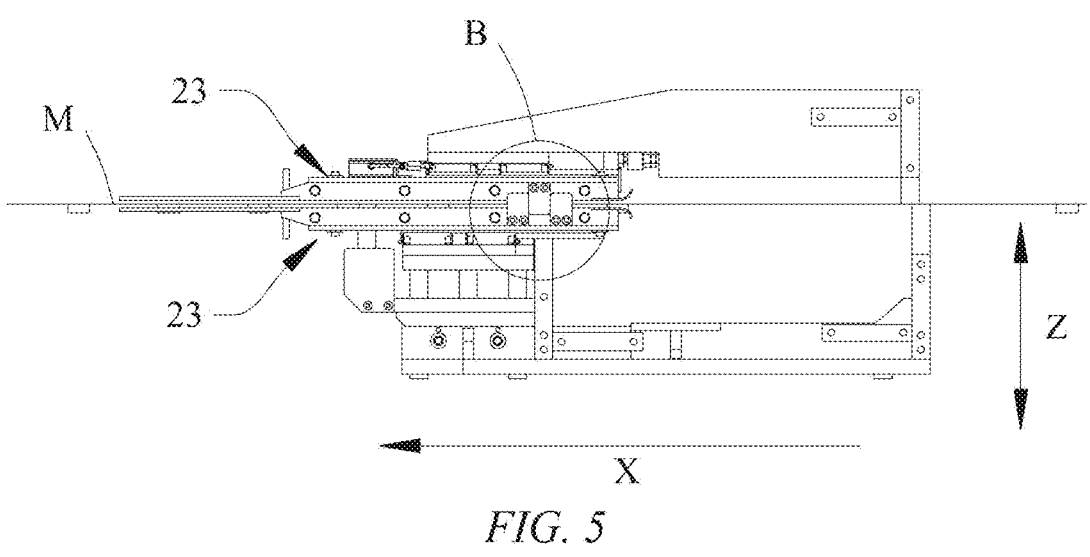
FIG. 5 is a schematic diagram of connection of two first heating assemblies according to some embodiments of the present application.
Figure 6:
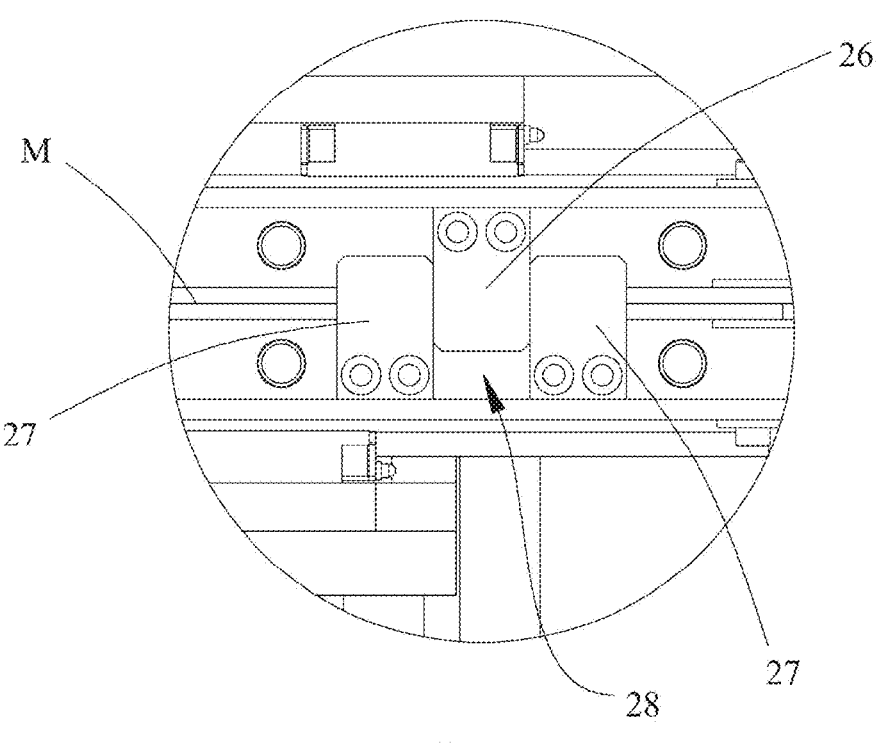
FIG. 6 is an enlarged view of part B of FIG. 5.

With reference to FIG. 5, FIG. 5 is a schematic diagram of connection of two first heating assemblies 23 according to some embodiments of the present application, and FIG. 6 is an enlarged view of part B of FIG. 5. According to some embodiments of the present application, optionally, as shown in FIGS. 5-6, one of the two first heating assemblies 23 is provided with two first limiting blocks 26, the other one of the two first heating assemblies is provided with a second limiting block 27, and a slot 28 for inserting the second limiting block 27 in a thickness direction Z of a separator M is formed between the two first limiting blocks 26.

The first limiting blocks 26 and the second limiting block 27 are located on the same side of the separator M in a width direction Y (see FIG. 8). In an embodiment in which the separator M is conveyed in a horizontal direction, one of the two first heating assemblies 23 is provided with the two first limiting blocks 26, and the other one of the two first heating assemblies is provided with the second limiting block 27. The first heating assembly 23 located above the separator M may be provided with the second limiting block 27, and the first heating assembly 23 located below the separator M may be provided with the two first limiting blocks 26.

The two first limiting blocks 26 are provided at a distance from each other in a feeding direction X of the separator M, and the slot 28 for inserting the second limiting block 27 in the thickness direction Z of the separator M is formed between the two first limiting blocks 26, such that the second limiting block 27 may be inserted into the slot 28 in the thickness direction Z of the separator M. After the second limiting block 27 is inserted into the slot 28, two sides of the second limiting block 27 are limited by the two first limiting blocks 26 in the feeding direction X of the separator M, and the second limiting block 27 cannot move relative to the two first limiting blocks 26 in the feeding direction X, and alternatively, even if the second limiting block 27 is movable in the slot 28, the amount of movement of the second limiting block 27 is small. Therefore, when a first driving module 30 drives a first heating module 20 to move, the two first limiting blocks 26 cooperate with the second limiting block 27 to allow the two first heating assemblies 23 to synchronously move in the feeding direction X.

The two first limiting blocks 26 define the slot 28 for inserting the second limiting block 27 in the thickness direction Z of the separator M. On the one hand, relative movements of the two first heating assemblies 23 may be guided, and stable relative movements of the two first heating assemblies 23 are ensured; and on the other hand, the two first heating assemblies 23 may be further connected in the feeding direction X of the separator M to ensure that the two first heating assemblies 23 can move synchronously in the feeding direction X of the separator M.

In some embodiments, the first limiting blocks 26 may be detachably connected to corresponding first heating assemblies 23, for example, by means of threaded connection, insertion, and engagement. The second limiting block 27 may be detachably connected to a corresponding first heating assembly 23, for example, by means of threaded connection, insertion, and engagement. The first limiting blocks 26 may be integrally formed on the corresponding first heating assemblies 23, and the second limiting block 27 may also be integrally formed on the corresponding first heating assembly 23.

In the previous embodiment, the second limiting block 27 may be a protrusion, and the slot 28 formed between the two first limiting blocks 26 may be an open recess. In some other embodiments, as an alternative to forming the open recess by oppositely arranging two second limiting blocks 27, the open recess may be a recess formed on a corresponding first heating assembly 23.

Figure 7:
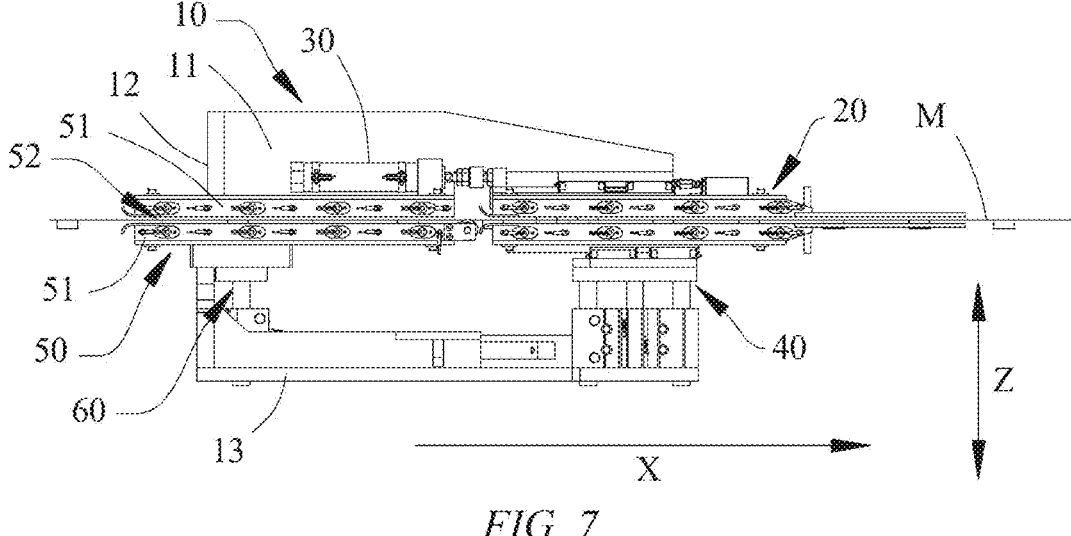
FIG. 7 is a schematic structural diagram of a heating device according to some other embodiments of the present application at a second position.

With reference to FIG. 7, FIG. 7 is a schematic structural diagram of the first heating module 20 of the heating device 100 according to some other embodiments of the present application at a second position. According to some embodiments of the present application, optionally, as shown in FIG. 7, the heating device 100 further includes a second heating module 50, and the second heating module 50 is mounted to a support 10 and located upstream of the first heating module 20.

The second heating module 50 is located upstream of the first heating module 20, and the separator M passes by the second heating module 50 and then passes by the first heating module 20 in the feeding direction X of the separator M. The second heating module 50 is configured to heat the separator M.

The second heating module 50 and the first heating module 20 are used cooperatively, so as to increase a heating area for the separator M in the feeding direction X of the separator M and improve the heating efficiency.

According to some embodiments of the present application, optionally, as shown in FIG. 7, the second heating module 50 includes two second heating assemblies 51 arranged oppositely in the thickness direction Z of the separator M, and a second gap 52 for the separator M to pass through is formed between the two second heating assemblies 51.

The two second heating assemblies 51 are arranged oppositely in the thickness direction Z of the separator M, and the second gap 52 for the separator M to pass through is formed between the two second heating assemblies 51, such that feeding of the separator M in the second gap 52 is facilitated, and two sides of the separator M in the thickness direction Z are heated. When the separator M is located in the second gap 52, the two second heating assemblies 51 may heat the separator M on opposite sides of the separator M in the thickness direction Z, such that the separator M is evenly heated to ensure a better heating effect.

In order to ensure the heating effect, the two second heating assemblies 51 are symmetrically distributed on two sides of the separator M.

In the thickness direction Z of the separator M, distances between the second heating assemblies 51 and the separator M may be equal to the distances between the first heating assemblies 23 and the separator M. Alternatively, distances between the second heating assemblies 51 and the separator M may be unequal to the distances between the first heating assemblies 23 and the separator M.

The second gap 52 for the separator M to pass through is formed between the two second heating assemblies 51, such that the separator M may be heated on opposite sides of the separator M, and a desirable heating effect is provided.

According to some embodiments of the present application, optionally, as shown in FIG. 7, the heating device 100 further includes a third driving module 60, and the third driving module 60 is mounted to the support 10 to drive the two second heating assemblies 51 to move close to or away from each other in the thickness direction Z of the separator M, so as to change a size of the second gap 52.

The size of the second gap 52 indicates the distance between two second heating assemblies 51 in the thickness direction Z of the separator M. The two second heating assemblies 51 may move close to or away from each other in the thickness direction Z of the separator M, such that the size of the second gap 52 is reduced or increased, that is, the distances between the second heating assemblies 51 and the separator M are changed.

The third driving module 60 is configured to provide a driving force, and the third driving module 60 drives the two second heating assemblies 51 to move close to or away from each other in the thickness direction Z of the separator M, such that the size of the second gap 52 may be adjusted depending on different separators M, providing high adaptability to meet heating requirements. In addition, the second gap 52 is enlarged, such that penetration of the separator M is facilitated, and the production efficiency is improved.

In an embodiment in which the separator M is conveyed in a horizontal direction and the support 10 includes a first sub-support 11, a second sub-support 12 and a third sub-support 13, the two second heating assemblies 51 are located on two sides of the separator M in the thickness direction Z, the second heating assembly 51 located above the separator M is mounted to the second sub-support 12, the third driving module 60 is mounted to the third sub-support 13, the second heating assembly 51 located below the separator M is connected to an output end of the third driving module 60, and the third driving module 60 drives the second heating assembly 51 located below the separator M to move in the thickness direction Z of the separator M.

According to some embodiments of the present application, optionally, the output end of the third driving module 60 is configured to reciprocate in the thickness direction Z of the separator M. The third driving module 60 may be a driving structure such as an air cylinder, a hydraulic cylinder, or an electric push rod, or a driving structure in which an electric motor cooperate with a transmission assembly, wherein the transmission assembly may be a rack and pinion transmission assembly, a screw and nut transmission assembly, a belt transmission assembly, a chain transmission assembly, etc.

In some embodiments, the third driving module 60 may be a hydraulic cylinder, which is simple in structure and easy to assemble.

With reference to FIG. 8, FIG. 8 is a schematic structural diagram of a heating device 100 according to some embodiments of the present application. According to some embodiments of the present application, as shown in FIG. 8, the heating device 100 further includes a detection unit 80 and a position adjustment module 90. The detection unit 80 is configured to detect offset information of an edge of a separator M. The position adjustment module 90 is configured to adjust a position of the detection unit 80 in a width direction Y of the separator M.

The offset information of the edge of the separator M refers to position information of the edge of the separator M relative to a support 10 in the width direction Y of the separator M, that is, information of the distance from the edge of the separator M to the support 10. In an initial state, the distance between the edge of the separator M and the support 10 has a preset value. The detection unit 80 detects the offset information of the edge of the separator M, i.e., by comparing the distance between the edge of the separator M and the support 10 with the preset value. If the distance between the edge of the separator M and the support 10 which is detected by the detection unit 80 is greater than or smaller than the preset value, the edge of the separator M is offset.

The detection unit 80 detects the offset information of the edge of the separator M, so as to know a conveying condition of the separator M, facilitate adjustment of the separator M, and ensure a heating effect of the separator M.

The position adjustment module 90 is configured to adjust the position of the detection unit 80 in the width direction Y of the separator M, such that the detection unit 80 may detect the offset information of the edge of the separator M to adapt to separators M having different specifications, providing a high adaptability.

Figure 9:
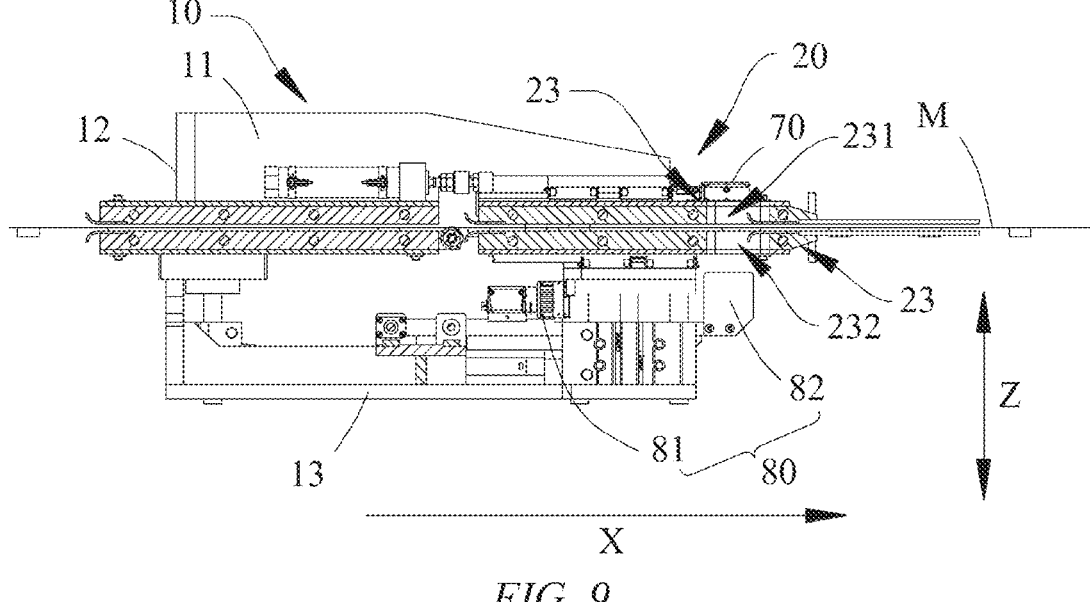
FIG. 9 is a cross-sectional view of a heating device according to some embodiments of the present application.

With reference to FIG. 9, FIG. 9 is a cross-sectional view of a heating device 100 according to some embodiments of the present application. According to some embodiments of the present application, optionally, as shown in FIG. 9, two first heating assemblies 23 are provided with a first opening 231 therethrough in a thickness direction Z of a separator M and a second opening 232 therethrough in the thickness direction Z of the separator M, respectively, the first opening 231 corresponds to the second opening 232 in position, the heating device 100 further includes a light source 70, the light source 70 is arranged at the first opening 231, a detection unit 80 includes a camera 81, and the camera 81 is configured to acquire image information of an edge of the separator M through the second opening 232.

One of the two first heating assemblies 23 is provided with the first opening 231, and the other one of the two first heating assemblies is provided with the second opening 232. The first opening 231 and the second opening 232 are provided through corresponding first heating assemblies 23, respectively, and projections of the first opening 231 and the second opening 232 in the thickness direction Z of the separator M coincide. "The camera 81 configured to acquire the image information of the edge of the separator M through the second opening 232" means that the camera 81 acquires the image information of the edge of the separator M through the second opening 232, in other words, the camera 81 and the light source 70 are located on two sides of the separator M in the thickness direction Z, respectively, that is, the camera 81 corresponds to one of the two first heating assemblies 23, and the light source 70 corresponds to the other one of the two first heating assemblies 23.

In an embodiment in which a support 10 includes a first sub-support 11, a second sub-support 12 and a third sub-support 13, the camera 81 may be arranged on the third sub-support 13, and the first heating assembly 23 corresponding to the light source 70 may be arranged on the first sub-support 11. The camera 81 acquires an image of the edge of the separator M when a first heating module 20 is located at a second position.

The camera 81 acquires the image information of the edge of the separator M and analyzes a position of the edge of the separator M, so as to determine offset information of the edge of the separator M. The light source 70 provides backlight for the camera 81 for a clear image acquired by the camera 81. The light source 70 and the camera 81 are arranged on opposite sides of the separator M, respectively, such that the camera 81 may acquire the image of the edge of the separator M, and the accuracy of the image is ensured.

In some embodiments, the first opening 231 and the second opening 232 extend in a width direction Y of the separator M, such that the camera 81 may acquire image information of more areas.

Figure 10:
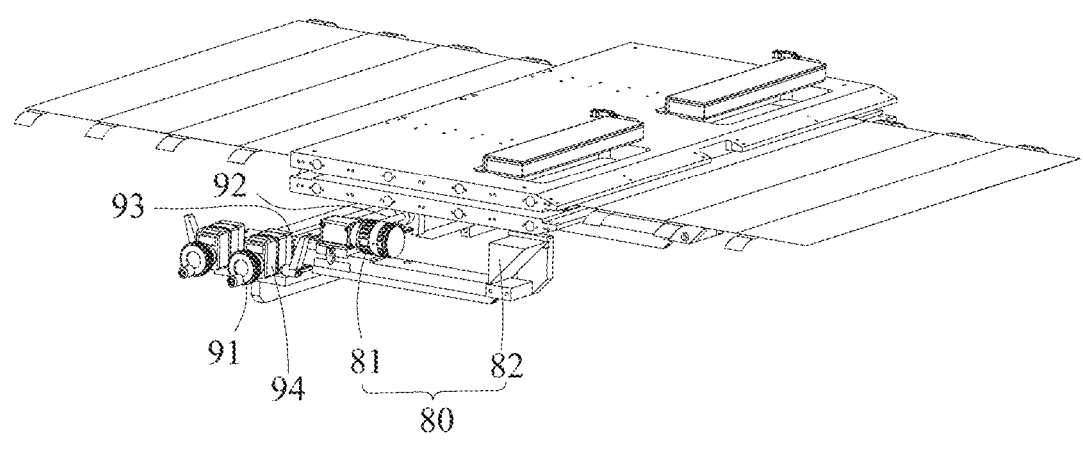
FIG. 10 is a schematic structural diagram of a detection unit according to some embodiments of the present application.

With reference to FIG. 10, FIG. 10 is a schematic structural diagram of a detection unit 80 according to some embodiments of the present application. According to some embodiments of the present application, optionally, as shown in FIGS. 9-10, the detection unit 80 further includes a reflector 82, and the reflector 82 is arranged at a second opening 232 and is configured to reflect an image of an edge of a separator M to a camera 81.

By means of the reflection of the reflector 82, a transmission path for light may be a broken line, and a light source 70 and the camera 81 may not need to be arranged in line, such that a position of the camera 81 may be rationally arranged to provide a rational configuration and less space occupation.

According to some embodiments of the present application, optionally, as shown in FIG. 8, a position adjustment module 90 includes an adjustment handle 91, a lead screw 92, and a nut 93. The lead screw 92 is rotatably mounted to a support 10, the lead screw 92 extends in the width direction Y of the separator M, the adjustment handle 91 is connected to one end of the lead screw 92, the nut 93 is sleeved on the lead screw 92 and is in threaded connection with the lead screw 92, and the detection unit 80 is connected to the nut 93.

The camera 81 and the reflector 82 are connected to the nut 93. When the nut 93 moves along the lead screw 92, the camera 81 and the reflector 82 move along with the nut 93. The adjustment handle 91 is driven to rotate to drive the lead screw 92 to rotate, and the nut 93 moves along the lead screw 92, such that the detection unit 80 moves along the lead screw 92, and the position of the detection unit 80 in the width direction Y of the separator M may be adjusted.

The adjustment handle 91 drives the lead screw 92 to rotate to adjust the position of the detection unit 80 to allow for easy and inexpensive adjustment. A transmission mode of the lead screw 92 and the nut 93 facilitates precise control of the position of the detection unit 80.

In an embodiment in which the support 10 includes a first sub-support 11, a second sub-support 12 and a third sub-support 13, the lead screw 92 is rotatably mounted to the third sub-support 13. In an embodiment in which the separator M is conveyed in a horizontal direction, the third sub-support 13 is located below the separator M, and each of the position adjustment module 90, the camera 81 and the reflector 82 is located below the separator M, so as to reduce space occupation above the separator M.

According to some embodiments of the present application, optionally, as shown in FIGS. 8 and 10, the position adjustment module 90 further includes a hoop locking assembly 94, and the hoop locking assembly 94 is configured to lock the lead screw 92 to limit rotation of the lead screw 92 relative to the support 10. The hoop locking assembly 94 is used to lock the lead screw 92, which is convenient to operate and improves the production efficiency. The locking assembly may also be other locking structures, such as a limiting pin and a limiting clamp, as long as the rotation of the lead screw 92 relative to the support 10 may be limited.

In some other embodiments, the adjustment handle 91 may also be replaced with a driving motor, and the driving motor may drive the lead screw 92 to rotate. In this solution, there is no need to provide the hoop locking assembly 94, and reverse rotation of the lead screw 92 may be limited by stopping an electric motor.

According to some embodiments of the present application, optionally, the number of detection units 80 is two, and the two detection units 80 are arranged at a distance from each other in the width direction Y of the separator M (see FIG. 8), and each detection unit 80 detects offset information of one edge of the separator M in the width direction Y. Correspondingly, the number of position adjustment modules 90 is two, and the two position adjustment modules 90 are in one-to-one correspondence to the two detection units 80.

The adjustment handles 91 of the two position adjustment modules 90 may be arranged on the same side of the separator M in the width direction Y to facilitate operations. Alternatively, the adjustment handles 91 of the two position adjustment modules 90 may be arranged on two sides of the separator M in the width direction Y.

According to some embodiments of the present application, with reference to FIGS. 8-9, the present application provides a heating device 100. The heating device 100 includes a support 10, a first heating module 20, a first driving module 30, a second driving module 40, a second heating module 50, a third driving module 60, a light source 70, a detection unit 80, and a position adjustment module 90. The support 10 includes a first sub-support 11, a second sub-support 12, and a third sub-support 13. a separator M is conveyed in a horizontal direction. The second sub-support 12 is arranged in a thickness direction Z of the separator M. The first sub-support 11 and the third sub-support 13 are arranged at two ends of the second sub-support 12 in the thickness direction Z of the separator M. The first sub-support 11 and the third sub-support 13 are arranged in parallel with the separator M. The first driving module 30 is mounted to the first sub-support 11, and the second driving module 40 is arranged on the third sub-support 13.

The first heating module 20 includes a first heating unit 21 and a second heating unit 22 connected in a feeding direction X of the separator M. The second heating unit 22 is closer to a first station W than the first heating unit 21, and a surface of the second heating unit 22 away from the separator M is closer to the separator M than a surface of the first heating unit 21 away from the separator M, such that the second heating unit 22 may extend into narrower space environment. The first heating module 20 includes two first heating assemblies 23 arranged oppositely in the thickness direction Z of the separator M, a first gap 24 for the separator M to pass through is formed between the two first heating assemblies 23, and the second driving module 40 is configured to drive two first heating units 21 to move close to or away from each other to change a size of the first gap 24. One of the two first heating assemblies 23 is located above the separator M. The first heating assembly 23 is slidably connected to an output end of the first driving module 30 in the feeding direction X of the separator M. The first heating assembly 23 is slidably connected to the support 10. The other one of the two first heating assemblies 23 is located below the separator M. The first heating assembly 23 is slidably connected to an output end of the second driving module 40 in the feeding direction X of the separator M. The first heating assembly 23 located above the separator M is slidably connected to the first heating assembly 23 located below the separator. The first heating assembly 23 located above the separator M is provided with a second limiting block 27, the first heating assembly 23 located below the separator M is provided with two first limiting blocks 26, and a slot 28 for inserting the second limiting block 27 in the thickness direction Z of the separator M is formed between the two first limiting blocks 26. The first limiting blocks 26 cooperate with the second limiting block 27 to enable the two first heating assemblies 23 to move close to or away from each other, and the two first heating assemblies 23 may synchronously move in the feeding direction X of the separator M.

The second heating module 50 is arranged upstream of the first heating module 20, the second heating module 50 includes two second heating assemblies 51 arranged oppositely in the thickness direction Z of the separator M, a second gap 52 for the separator M to pass through is formed between the two second heating assemblies 51, and the third driving module 60 is configured to drive the two second heating assemblies 51 to move close to or away from each other to change a size of the second gap 52. The second heating assembly 51 located above the separator M is mounted to the second sub-support 12, the third driving module 60 is mounted to the third sub-support 13, and the second heating assembly 51 located below the separator M is connected to an output end of the third driving module 60. The two first heating assemblies 23 are provided with a first opening 231 therethrough in the thickness direction Z of the separator M and a second opening 232 therethrough in the thickness direction Z of the separator M, respectively, the first opening 231 is in the first heating assembly 23 located above the separator M, and the second opening 232 is in the first heating assembly 23 located below the separator M. The light source 70 is arranged at the first opening 231.

There are two detection units 80. The two detection units 80 are located at two ends of the separator M in a width direction Y, respectively, each detection unit 80 includes a camera 81 and a reflector 82, and the camera 81 is configured to acquire image information of an edge of the separator M through the second opening 232. The reflector 82 is arranged at the second opening 232 and is configured to reflect an image of the edge of the separator M to the camera 81. The position adjustment module 90 includes an adjustment handle 91, a lead screw 92, and a nut 93. The lead screw 92 is rotatably mounted to the third sub-support 13, the lead screw 92 extends in the width direction Y of the separator M, the adjustment handle 91 is connected to one end of the lead screw 92, the nut 93 is sleeved on the lead screw 92 and is in threaded connection with the lead screw 92, and the camera 81 and the reflector 82 are connected to the nut 93. The adjustment handle is rotated to adjust a position of the detection unit 80 in the width direction Y of the separator M, so as to adapt to separators M having different specifications.

Figure 11:
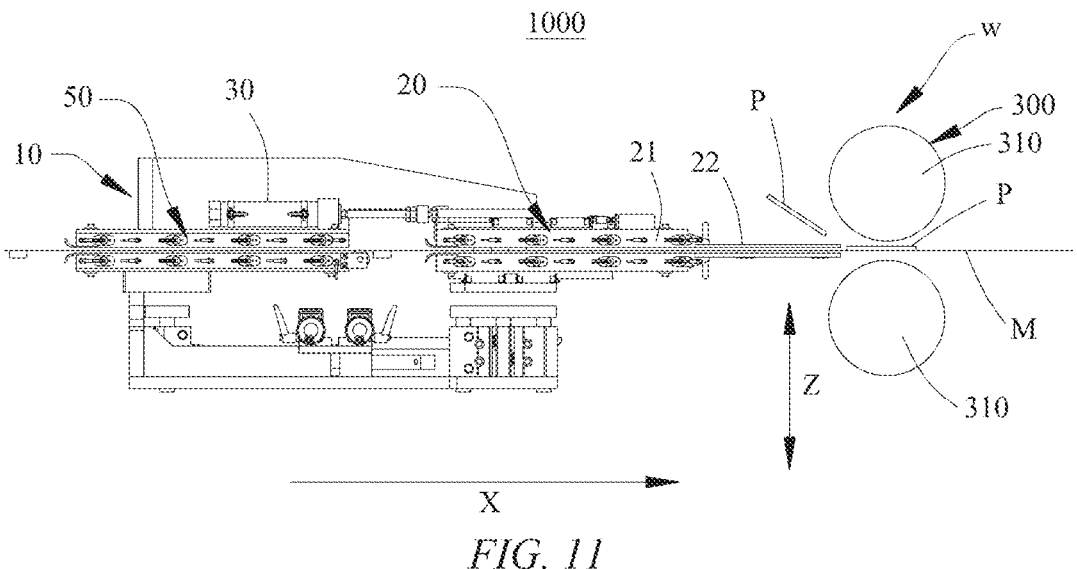
FIG. 11 is a schematic diagram of a first heating module of a battery manufacturing apparatus according to some embodiments of the present application at a second position.
Figure 12:
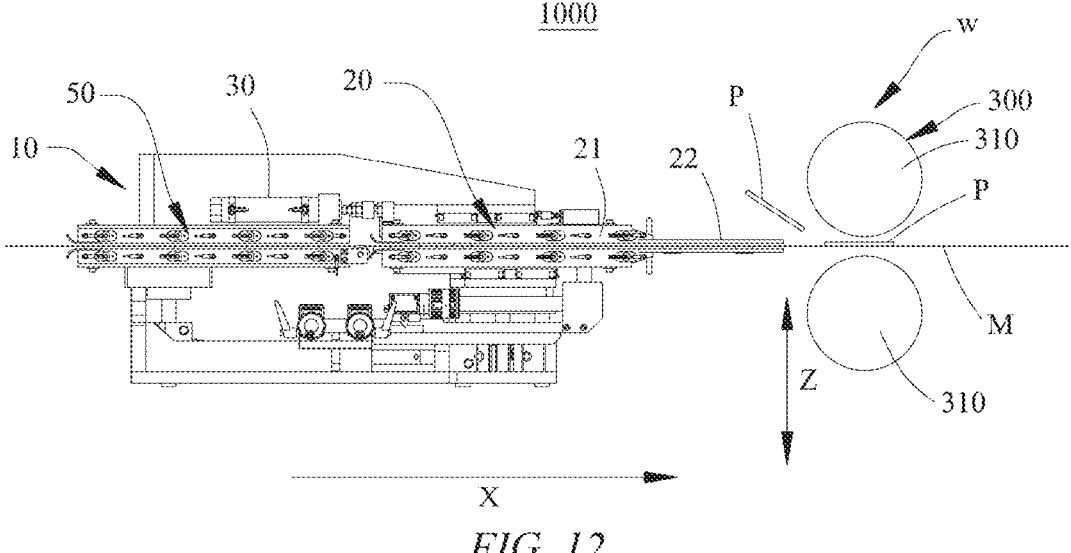
FIG. 12 is a schematic diagram of the first heating module of a battery manufacturing apparatus according to some embodiments of the present application at a first position.

With reference to FIG. 11, FIG. 11 is a schematic diagram of a first heating module 20 of a battery manufacturing apparatus 1000 according to some embodiments of the present application at a second position, and FIG. 12 is a schematic diagram of the first heating module 20 of the battery manufacturing apparatus 1000 according to some embodiments of the present application at a first position.

According to some embodiments of the present application, as shown in FIGS. 11-12, the present application further provides a battery manufacturing apparatus 1000. The battery manufacturing apparatus 1000 includes a conveying device (not shown), a hot pressing device 300, and the heating device 100 described in any one of the solutions. The conveying device is configured to convey a separator M. The heating device 100 is configured to heat the separator M. The hot pressing device 300 is located at a first station W, and the hot pressing device 300 is configured to bonding a plate P to the separator M by hot pressing. The hot pressing device 300 includes two hot pressing rollers 310. The two hot pressing rollers 310 are arranged at a distance from each other in a thickness direction of the separator M, the two hot pressing rollers 310 are configured to roll the plate P and the separator M so as to bond the plate P to the separator M by hot pressing.

Figure 13:
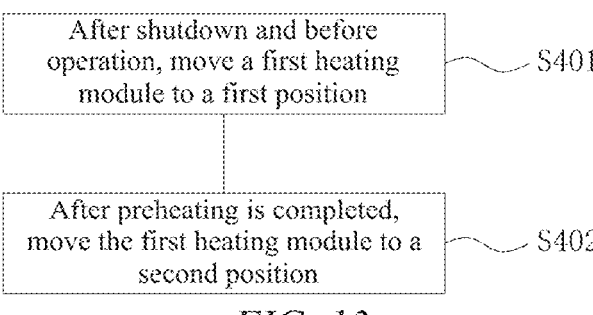
FIG. 13 is a schematic flow diagram of a battery manufacturing method according to some embodiments of the present application.

With reference to FIG. 13, FIG. 13 is a schematic flow diagram of a battery manufacturing method according to some embodiments of the present application. According to some embodiments of the present application, the present application further provides a battery manufacturing method, which uses the battery manufacturing apparatus 1000 described above. As shown in FIG. 13, the battery manufacturing method includes the following steps.

At step S401, after shutdown and before operation, a first heating module 20 is moved to a first position to preheat the part of a separator M between a heating device 100 and a hot pressing device 300.

At step S402, after the preheating is completed, the first heating module 20 is moved to a second position to heat the separator M, and a conveying device is operated.

The first position is closer to a first station W than the second position, and the hot pressing device 300 is located at the first station W. After shutdown and before operation, as shown in FIG. 11, a first driving module 30 drives the first heating module 20 to move to the first position relative to the support 10 in a feeding direction X of the separator M, a second heating unit 22 of the first heating module 20 is activated to preheat the separator M, after the temperature at the separator M satisfies process requirements, a first heating unit 21 is activated, and after the temperature reaches a start-up temperature, preheating of the separator M is completed. As shown in FIG. 12, the first heating module 20 is moved to the second position, the conveying device is operated to convey the separator M, and the first heating module 20 and a second heating module 50 together heat the separator M.

While the present application has been described with reference to the preferred embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. A heating device, the heating device comprising:
a support;
a first heater movably mounted to the support for heating a material strip upstream of a first station, wherein the first heater comprises a first heating structure and a second heating structure connected to each other, and the first heater comprises two first heating assemblies arranged oppositely in a thickness direction of the material strip, and a first gap for the material strip to pass through is formed between the two first heating assemblies;
a first driver mounted to the support to drive the first heater to move in a feeding direction of the material strip, such that the first heater is movable between a first position close to the first station and a second position away from the first station, the first heating structure and the second heating structure being sequentially arranged in the feeding direction, the second heating structure being closer to the first station than the first heating structure, and a surface of the second heating structure away from the material strip being closer to the material strip than a surface of the first heating structure away from the material strip; and
a second driver for driving the two first heating assemblies to move close to or away from each other in the thickness direction of the material strip to change a size of the first gap, wherein
one of the two first heating assemblies is connected to an output end of the first driver, the other one of the two first heating assemblies is connected to an output end of the second driver, and the two first heating assemblies are slidably connected to each other in the thickness direction of the material strip, and
the other one of the two first heating assemblies is slidably connected to the output end of the second driver in the feeding direction.

2. The heating device according to claim 1, wherein the first heating structure has higher heating power than the second heating structure.

3. The heating device according to claim 1, wherein one of the two first heating assemblies is provided with two first limiting blocks, the other one of the two first heating assemblies is provided with a second limiting block, and a slot for inserting the second limiting block in the thickness direction of the material strip is formed between the two first limiting blocks.

4. The heating device according to claim 1, wherein the heating device further comprises:
a second heater mounted to the support and located upstream of the first heater.

5. The heating device according to claim 4, wherein the second heater comprises two second heating assemblies arranged oppositely in the thickness direction of the material strip, and a second gap for the material strip to pass through is formed between the two second heating assemblies; the heating device further comprises:
a third driver mounted to the support and configured to drive the two second heating assemblies to move close to or away from each other in the thickness direction of the material strip to change a size of the second gap.

6. The heating device according to claim 1, wherein the heating device further comprises:
a detector to detect offset information of an edge of the material strip; and
a position adjustment structure to adjust a position of the detector in a width direction of the material strip.

7. A battery manufacturing apparatus, comprising:
a conveyer for conveying a separator;
the heating device according to claim 1, wherein the heating device is configured to heat the separator; and
a hot press located at the first station to bond a plate to the separator by hot pressing.

8. A heating device, the heating device comprising:
a support;

a first heater movably mounted to the support for heating a material strip upstream of a first station, wherein the first heater comprises a first heating structure and a second heating structure connected to each other, and the first heater comprises two first heating assemblies arranged oppositely in a thickness direction of the material strip, and a first gap for the material strip to pass through is formed between the two first heating assemblies;

a first driver mounted to the support to drive the first heater to move in a feeding direction of the material strip, such that the first heater is movable between a first position close to the first station and a second position away from the first station, the first heating structure and the second heating structure being sequentially arranged in the feeding direction, the second heating structure being closer to the first station than the first heating structure, and a surface of the second heating structure away from the material strip being closer to the material strip than a surface of the first heating structure away from the material strip;

a detector to detect offset information of an edge of the material strip; and a position adjustment structure to adjust a position of the detector in a width direction of the material strip, wherein the two first heating assemblies are provided with a first opening therethrough in the thickness direction of the material strip and a second opening therethrough in the thickness direction of the material strip, respectively, the first opening corresponds to the second opening in position, the heating device further comprises a light source arranged at the first opening, and the detector comprises a camera to acquire an image of the edge of the material strip through the second opening; optionally the detector further comprises a reflector arranged at the second opening for reflecting the image of the edge of the material strip to the camera.

9. The heating device according to claim 8, wherein the first heating structure has higher heating power than the second heating structure.

10. The heating device according to claim 8, wherein the heating device further comprises:

a second driver for driving the two first heating assemblies to move close to or away from each other in the thickness direction of the material strip to change a size of the first gap.

11. The heating device according to claim 10, wherein one of the two first heating assemblies is connected to an output end of the first driver, the other one of the two first heating assemblies is connected to an output end of the second driver, and the two first heating assemblies are slidably connected to each other in the thickness direction of the material strip.

12. The heating device according to claim 8, wherein the heating device further comprises:

a second heater mounted to the support and located upstream of the first heater.

13. The heating device according to claim 12, wherein the second heater comprises two second heating assemblies arranged oppositely in the thickness direction of the material strip, and a second gap for the material strip to pass through is formed between the two second heating assemblies; the heating device further comprises:

a third driver mounted to the support and configured to drive the two second heating assemblies to move close to or away from each other in the thickness direction of the material strip to change a size of the second gap.

14. A heating device, the heating device comprising:

a support;

a first heater movably mounted to the support for heating a material strip upstream of a first station, wherein the first heater comprises a first heating structure and a second heating structure connected to each other, and the first heater comprises two first heating assemblies arranged oppositely in a thickness direction of the material strip, and a first gap for the material strip to pass through is formed between the two first heating assemblies:

a first driver mounted to the support to drive the first heater to move in a feeding direction of the material strip, such that the first heater is movable between a first position close to the first station and a second position away from the first station, the first heating structure and the second heating structure being sequentially arranged in the feeding direction, the second heating structure being closer to the first station than the first heating structure, and a surface of the second heating structure away from the material strip being closer to the material strip than a surface of the first heating structure away from the material strip;

a detector to detect offset information of an edge of the material strip; and a position adjustment structure to adjust a position of the detector in a width direction of the material strip, wherein the position adjustment structure comprises an adjustment handle, a lead screw, and a nut, the lead screw being rotatably mounted to the support, the lead screw extending in the width direction of the material strip, the adjustment handle being connected to one end of the lead screw, the nut being sleeved on the lead screw and in threaded connection with the lead screw, and the detector being connected to the nut.

15. The heating device according to claim 14, wherein the first heating structure has higher heating power than the second heating structure.

16. The heating device according to claim 14, wherein the heating device further comprises:

a second driver for driving the two first heating assemblies to move close to or away from each other in the thickness direction of the material strip to change a size of the first gap.

17. The heating device according to claim 16, wherein one of the two first heating assemblies is connected to an output end of the first driver, the other one of the two first heating assemblies is connected to an output end of the second driver, and the two first heating assemblies are slidably connected to each other in the thickness direction of the material strip.

18. The heating device according to claim 14, wherein the heating device further comprises:

a second heater mounted to the support and located upstream of the first heater.

19. The heating device according to claim 18, wherein the second heater comprises two second heating assemblies arranged oppositely in the thickness direction of the material strip, and a second gap for the material strip to pass through is formed between the two second heating assemblies; the heating device further comprises:

a third driver mounted to the support and configured to drive the two second heating assemblies to move close to or away from each other in the thickness direction of the material strip to change a size of the second gap.

20. A battery manufacturing apparatus, comprising:

a conveyer for conveying a separator;

the heating device according to claim 14, wherein the heating device is configured to heat the separator; and a hot press located at the first station to bond a plate to the separator by hot pressing.

* * * * *